US 6,595,680 B2

(12) United States Patent
Sanpei et al.

(10) Patent No.: US 6,595,680 B2
(45) Date of Patent: Jul. 22, 2003

(54) FOOD MIXING APPARATUS

(75) Inventors: Keiichi Sanpei, Izumiotsu (JP); Yoshio Matsumoto, Sakai (JP); Sadao Fukushima, Nara (JP); Kiyoto Kasamatsu, Higashiosaka (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/784,811

(22) Filed: Feb. 14, 2001

(65) Prior Publication Data
US 2002/0015355 A1 Feb. 7, 2002

(30) Foreign Application Priority Data

Feb. 24, 2000 (JP) .................................... 2000-048031
Sep. 22, 2000 (JP) .................................... 2000-289253
Sep. 22, 2000 (JP) .................................... 2000-289255

(51) Int. Cl.$^7$ ............................ B01F 9/00; B01F 15/06
(52) U.S. Cl. .................. 366/147; 366/197; 366/217; 366/231; 99/348
(58) Field of Search ............................ 366/147, 144, 366/197, 231, 217, 605, 208, 215, 218, 239, 237, 219, 105; 99/348

(56) References Cited

U.S. PATENT DOCUMENTS

| 799,872 | A | * | 9/1905 | Schomber | 366/217 |
| 1,292,127 | A | * | 1/1919 | Stevens | 366/217 |
| 2,453,583 | A | * | 11/1948 | Muller | |
| 2,797,902 | A | * | 7/1957 | Beugler | |
| 3,018,092 | A | * | 1/1962 | Hutchings et al. | |
| 3,181,841 | A | * | 5/1965 | Boehm | |
| 3,559,960 | A | * | 2/1971 | Elder et al. | 366/187 |
| 3,706,443 | A | * | 12/1972 | Oberhauser | |
| 3,880,408 | A | * | 4/1975 | Karjalainen | |
| 3,999,742 | A | * | 12/1976 | Heyraud | 366/213 |
| 4,146,335 | A | * | 3/1979 | Hutchings et al. | |
| 4,173,925 | A | * | 11/1979 | Leon | |
| 4,235,553 | A | | 11/1980 | Gall | 366/208 |
| 4,445,782 | A | * | 5/1984 | Sparrow, Jr. | 366/217 |
| 4,491,415 | A | | 1/1985 | Bishop | 366/47 |
| 4,568,194 | A | * | 2/1986 | Gargioni | |
| 4,676,658 | A | * | 6/1987 | Herfeld | |
| 4,775,242 | A | * | 10/1988 | Bohle | 366/209 |
| 4,781,468 | A | * | 11/1988 | Herfeld | 366/213 |
| 4,789,245 | A | * | 12/1988 | Morbeck | |
| 4,896,968 | A | | 1/1990 | Baillie | 366/10 |
| 4,919,539 | A | | 4/1990 | Drocco | 366/94 |
| 4,957,373 | A | * | 9/1990 | Derksen et al. | |
| 4,963,032 | A | | 10/1990 | Strehlow | 366/57 |
| 5,054,933 | A | * | 10/1991 | Derksen et al. | |
| 5,118,198 | A | | 6/1992 | Whiteman, Jr. | 366/47 |
| 5,169,231 | A | | 12/1992 | Suzuki | 366/105 |
| 5,197,802 | A | * | 3/1993 | Miller et al. | |
| 5,261,744 | A | * | 11/1993 | Brunn | 366/217 |
| 5,383,163 | A | * | 1/1995 | Brunn | 366/217 |
| 5,466,065 | A | | 11/1995 | Catrombon | 366/209 |
| 5,507,575 | A | * | 4/1996 | Rossetti | 366/217 |
| 5,556,202 | A | | 9/1996 | Dorn | 366/213 |
| 5,575,559 | A | | 11/1996 | Roll | 366/171.1 |
| 5,788,371 | A | * | 8/1998 | Neri et al. | 366/217 |
| 6,241,380 | B1 | * | 6/2001 | Bornemann et al. | 366/217 |
| 6,367,963 | B2 | * | 4/2002 | Sanpei et al. | 366/208 |

OTHER PUBLICATIONS

Japanese reference H4–39326, discloses a mixing apparatus as illustrated and further described in partial English language translation, 16 pp.
Japanese reference H4–71457, discloses a rice mixing machine as illustrated and further described in the partial English language translation, 10 pp.

* cited by examiner

Primary Examiner—Tony G. Soohoo
(74) Attorney, Agent, or Firm—Webb Ziesenhiem Logsdon Orkin & Hanson P.C.

(57) ABSTRACT

A food mixing apparatus includes a mixing container for receiving food, a first support frame for supporting the mixing container to be rotatable about a first axis: X, a first drive mechanism disposed in the first support frame for rotating the mixing container, a second support frame for supporting the first support frame to be variable in posture relative to the second support frame, and a second drive mechanism for displacing the first support frame from one posture to another.

16 Claims, 10 Drawing Sheets

FOOD MIXING APPARATUS

BACKGROUND OF THE INVENTION

1. Field of the Invention

This invention relates to a food mixing apparatus for use in mixing boiled rice and vinegar, for example, to prepare vinegared rice (sushi rice).

2. Description of the Related Art

A known food mixing apparatus, as disclosed in Japanese Patent Laying-Open Publication H4-71457 or H7-39326, for example, includes a base, a rotary container (or mixing container) in the form of a bottomed cylinder rotatably cantilevered by the base through a horizontal shaft, a driving device for rotating the rotary container through the horizontal shaft, and a cooling device for forcibly feeding cooling air into the rotary container through the horizontal shaft.

With this food mixing apparatus, rice, vinegar and the like are placed in the rotary container through an upper opening, then the opening is closed with a lid, and the driving device is started to rotate the rotary container about a horizontal axis. The rice in the rotary container is raised successively by the inner wall, bottom wall and lid of the rotary container, and at the same time is moved from wall surfaces counter to a direction of rotation of the rotary container. The lid has an air discharge tube projecting into the rotary container to discharge cooling air therefrom. When the lid is rotated downward, the air discharge tube divides the rice, vinegar and the like to opposite sides, thereby mixing these contents well.

In the above food mixing apparatus, however, the rotary container is rotated only in one direction about a horizontal axis. The food in the rotary container merely repeats the unvarying movement. Despite the air discharge tube projecting into the rotary container, the rice tends to become masses, making it difficult to mix the vinegar evenly therewith. A long mixing time is needed, which results in sticky rice.

In the prior apparatus, the continuous 360-degree rotation of the rotary container generates a centrifugal force that produces strong vibration. This results in an increased load acting on the connection between the rotary container and the base, thereby lowering durability of the apparatus.

SUMMARY OF THE INVENTION

This invention has been made having regard to the state of the art noted above, and its object is to provide a food mixing apparatus which moves food inside a mixing container in varied ways, thereby evenly mixing the food within a short time.

A food mixing apparatus according to this invention comprises a mixing container for receiving food, a first support frame for supporting the mixing container to be rotatable about a first axis, a first drive mechanism disposed in the first support frame for rotating the mixing container, a second support frame for supporting the first support frame to be variable in posture relative to the second support frame, and a second drive mechanism for displacing the first support frame from one posture to another.

With the above construction, food may be mixed by rotating the mixing container about the first axis while varying the posture of the first support frame supporting the mixing container. As a result, the mixing container, rather than rotating in one direction only, makes a complex movement combining the rotation with posture variations of the first support frame. The food is thereby moved in varied ways to be mixed evenly in a short time.

In this invention, the first support frame may be supported by the second support frame to be rotatable about a second axis different from the first axis. This facilitates the posture variations of the first frame, and moves the food in various directions with ease.

In particular, it is preferable to mix the food in the mixing container by oscillating the first support frame about the second axis while rotating the mixing container about the first axis. By oscillating the first support frame in this way, vibration may be reduced compared with the case of continuously rotating the first support frame 360 (. Reduced loads act on a connection between the first and second support frames and on a connection between the mixing container and the first support frame. A complex motion of the mixing container may be secured by the rotation about the first axis and reciprocation about the second axis, thereby optimizing the operation to mix the food. In this case, the first axis and the second axis preferably extend perpendicular to each other.

In a preferred embodiment of this invention, the second drive mechanism is disposed in the first support frame for varying the posture of the first support frame. Thus, both the first and second drive mechanisms are disposed in the first support frame, which facilitates a synchronous operation of the two drive mechanisms. In this case, it is easy to arrange that the first and second drive mechanisms be driven by a single drive source. This achieves a simplified construction and a reduction in cost.

In a further preferred embodiment of this invention, the first support frame includes an aerating device for feeding cooling air into the mixing container, an air intake for allowing the aerating device to draw ambient air as the cooling air, and an air outlet for discharging the cooling air from the mixing container. This construction allows the cooling air to flow smoothly into and out of the mixing container varying its posture (or oscillating) with the first support frame.

The first support frame may include an aerating device for feeding cooling air into the mixing container, the aerating device and a drive source of the first and second drive mechanisms being opposed to each other across the second axis. In this construction, an excellent weight balance may be maintained between the portion of the first support frame having the aerating device and the portion thereof having the first drive mechanism and/or second drive mechanism. This suppresses vibration due to posture variations (rotation or oscillation) about the second axis.

Further, in a preferred embodiment of this invention, the mixing container has an opening formed in a wall thereof, a ventilating tube extending through the opening, and a guide member disposed in the mixing container and extending radially outwardly of the ventilating tube to cover the opening as spaced therefrom, the opening and the ventilating tube defining a first passage therebetween for circulating air, the wall and the guide member defining a second passage therebetween in communication with the first passage, and the ventilating tube defining a third passage therein in communication with the second passage through the mixing container.

With this construction, the cooling air emerging from the first passage is guided to flow radially outwardly by the second passage communicating with the first passage. Thus, the cooling air circulates in the mixing container without being discharged immediately from the third passage. After circulating in the mixing container, the cooling air is discharged from the third passage. As a result, the food in the mixing container may be cooled evenly and efficiently in a short time.

Further, it is proposed that the wall and the guide member have a leakage preventing member disposed therebetween for allowing a circulation of air and preventing the food leaking from the mixing container. Then, the food may be prevented from leaking outside the mixing container without impairing the air circulation.

It is proposed also that the food mixing apparatus further comprises a discharge tube disposed in the mixing container for discharging air having cooled the food, and a barrier mounted in the discharge tube for stopping water flowing out of the discharge tube when the discharge tube is directed downward. With this construction, when the discharge tube is directed downward, the barrier stops a downward flow of drops of water such as dew drops formed on the inner peripheral surface of the discharge tube. Thus, the water is prevented from dripping outside to wet the frames of the apparatus and adjacent areas, or to allow dust and the like to adhere to the frames and adjacent objects. In this case, the mixing container may make a mixing movement with the discharge tube constantly directed downward (not only straight downward but also obliquely downward), or may make a mixing movement with the discharge tube temporarily directed downward.

The discharge tube extends from inside to outside of the mixing container, the barrier being formed in an inner periphery of a portion of the discharge tube projecting from the mixing container. Where the discharge tube extends from inside to outside of the mixing container as above, the portion of the discharge tube outside the mixing container, in particular, tends to be cooled by ambient air to form dew drops. The barrier formed in that portion is effective to stop an outflow of the dew drops.

Particularly, where the mixing container is constructed to mix the food by oscillating vertically between a posture to direct the discharge tube downward and a posture to direct the discharge tube upward, the dew drops and the like stopped by the barrier when the discharge tube is directed downward are returned into the mixing container when the discharge tube is directed upward. This prevents the water from accumulating in the discharge tube and overflowing the barrier. Further, with the mixing container oscillating vertically, the dew drops and the like have a minimum chance of scattering away by centrifugal force.

Other features and advantages of this invention will be apparent from the following description of the embodiment to be taken with reference to the drawings.

DESCRIPTION OF THE PREFERRED EMBODIMENTS

Figure 1:
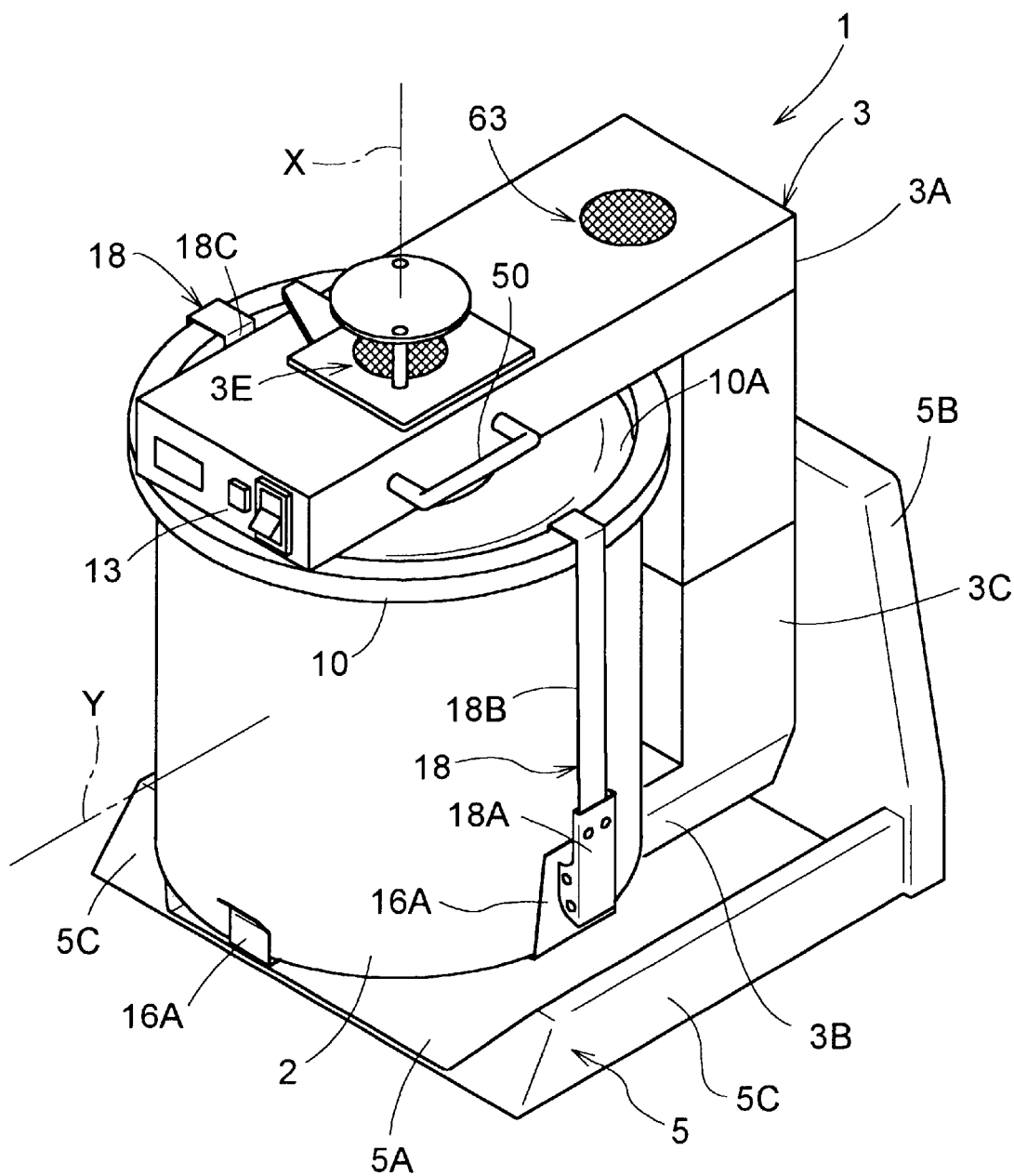
FIG. 1 is a perspective view of a food mixing apparatus according to this invention.
Figure 2:
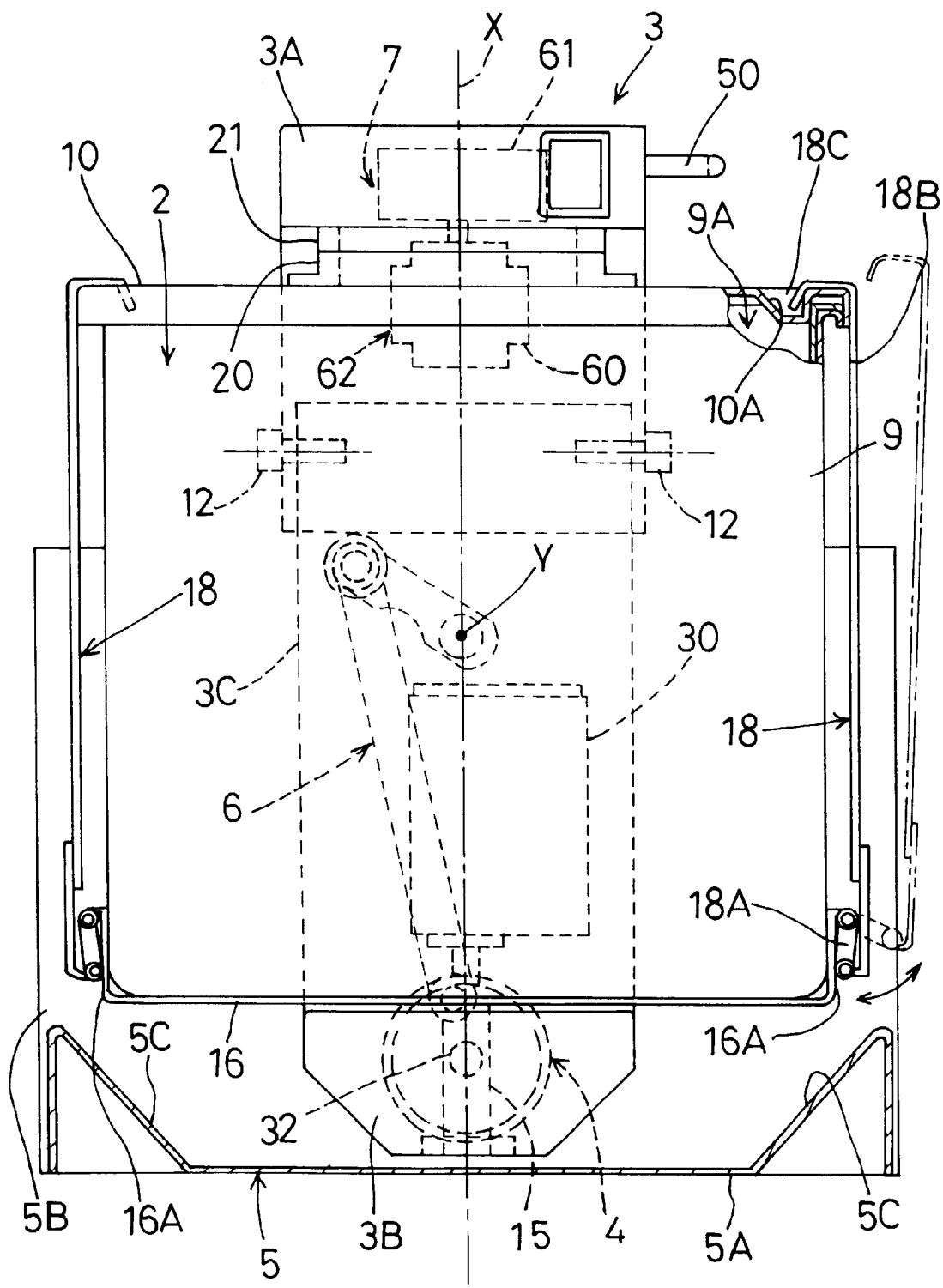
FIG. 2 is a front view of the food mixing apparatus.
Figure 3:
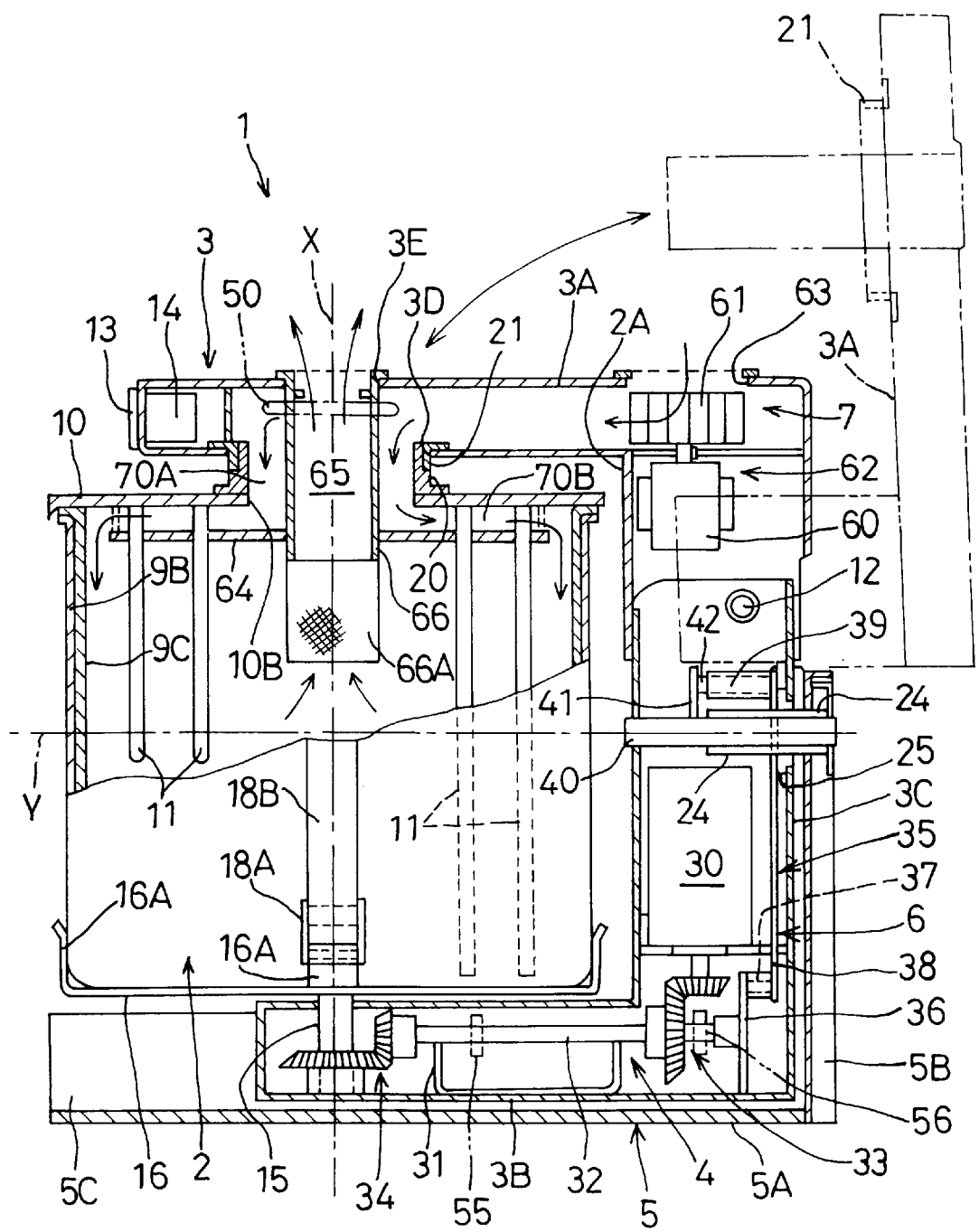
FIG. 3 is a side view, partly in section, of the food mixing apparatus.

As shown in FIGS. 1 through 3, a food mixing apparatus 1 according to this invention includes a mixing container 2 for receiving food such as cooked rice and vinegar, a first support frame 3 for supporting the container 2 to be rotatable about a first axis X, a first driving device 4 for driving the mixing container 2 to rotate about the first axis X, a second support frame 5 for supporting the first support frame 3 to be posture-variable (rotatable) about a second axis (i.e. a fore and aft horizontal axis) Y, a second driving device 6 for driving the first support frame 3 to vary posture, and an aerating mechanism 7 for cooling the food by circulating air through the mixing container 2.

The food mixing apparatus 1 is constructed to execute different steps successively or execute one of these steps separately from the other steps after food is placed in the mixing container 2. Such steps include a step of mixing the food by rotating the mixing container 2 about the first axis X, and at the same time rotating (or oscillating) the first support frame 3 about the second axis Y; a steaming step where the mixing container 2 and first support frame 3 are stopped for a predetermined time after the mixing step; and a step of cooling the food by operating the aerating mechanism 7 while continuously or intermittently engaging the mixing container 2 in a mixing motion.

The food mixing apparatus 1 in this embodiment has a relatively small construction for use mainly at an ordinary home, small restaurant or the like. The apparatus 1 has overall dimensions about 40 cm wide, about 50 cm deep and about 50 cm high.

The mixing container 2 includes a main container body 9 in the form of a bottomed cylinder having an opening 9A formed at one end thereof (the upper end in FIGS. 2 and 3), and a lid 10 for openably closing the opening 9A of main body 9. The mixing container 2 in this embodiment is supported by the first support frame 3, with a container axis (cylinder's center axis) aligned to the first axis X.

The lid 10 has a plurality of rod-shaped stirring members 11 extending vertically from an inner surface thereof into the main body 9. However, these stirring members 11 are not limited to the rod shape, but may be vane-shaped or comb-shaped.

Figure 4:
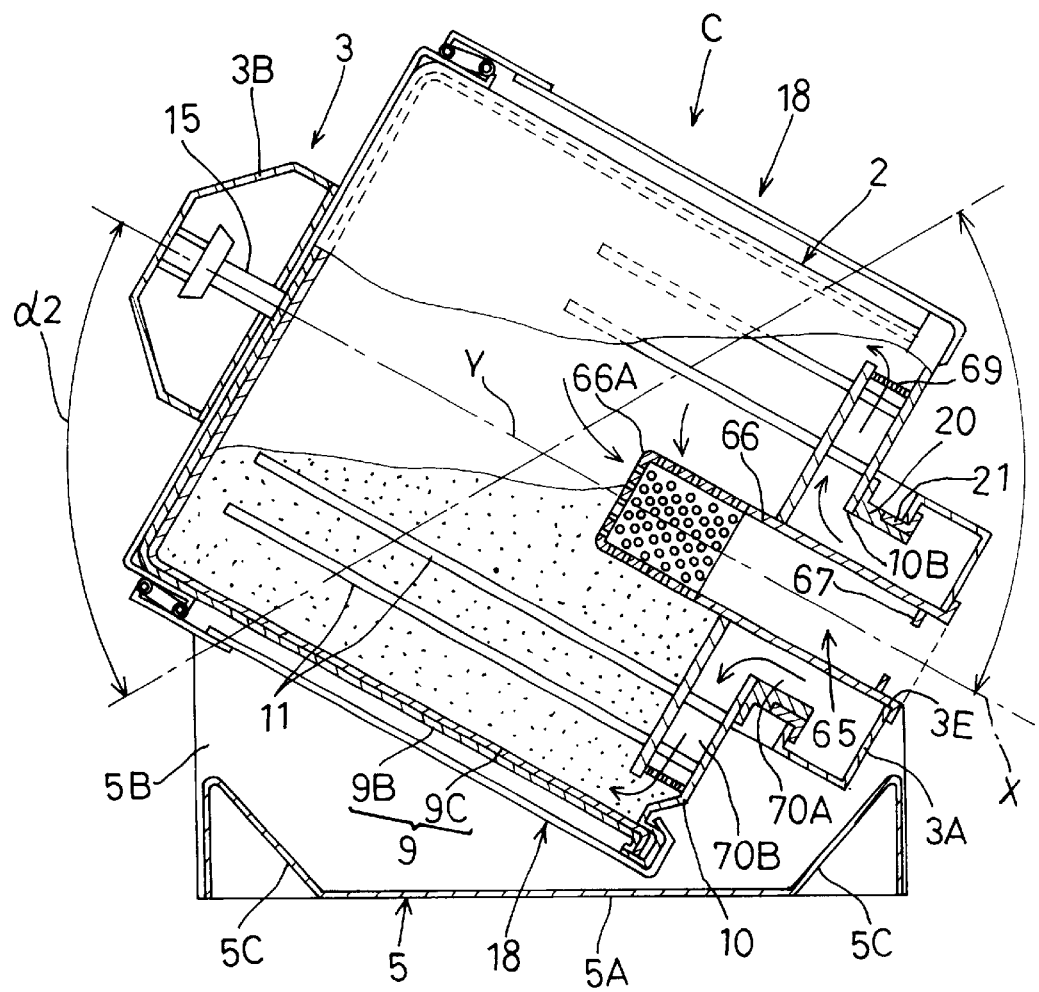
FIG. 4 is a sectional front view showing a first support frame and a mixing container in a third posture during a mixing operation.

As shown in FIGS. 3 and 4, the main container body 9 has a two-layer structure with an outer container 9B and an inner container 9C. The inner container 9C is formed of a hard plastic material, and is removably mounted in the outer container 9B.

The inner container 9C is replaceable with other containers according to the types of food to be mixed. When mixing boiled rice with assorted materials after making sushi rice, for example, the inner container 9C may be replaced with another inner container. This ensures the flavor and taste of rice with assorted materials, free from the smell and acidity of vinegar.

The main container body 9 is not limited to the two-layer structure, but may have a single-layer structure as in the prior art, or may have three or more layers.

Further, the main container body 9 may be formed as a bottomed box, or a cylinder with a bottom wall curved in a dome shape.

As shown in FIG. 3, the first support frame 3 as a whole is channel-shaped in side view, and includes a box-shaped upper frame 3A disposed above the mixing container 2 (adjacent the lid 10) and elongated in the fore and aft direction, a box-shaped lower frame 3B disposed below the mixing container 2 (adjacent the bottom) and elongated in the fore and aft direction, and a box-shaped middle frame 3 elongated in the vertical direction and interconnecting rear ends of the upper frame 3A and lower frame 3B. The mixing container 2 is held between the upper frame 3A and lower frame 3B. The first support frame 3 has a smaller width in front view than the mixing container 2.

The middle frame 3C is divided in a vertically intermediate position (slightly above the vertically middle position) into two parts. The two parts are connected together to be pivotable relative to each other through right and left connecting rods 12 mounted in the position of division. The upper portion of middle frame 3C is formed integrally with the upper frame 3A, while the lower portion is formed integrally with the lower frame 3B.

The upper frame 3A has a control 14 with a control panel 13 mounted in the front end thereof for controlling operation of the first and second driving devices 4 and 6.

The lower frame 3B has a pivot shaft 15 rotatably mounted in a forward region thereof and extending vertically (along the first axis X). The pivot shaft 15 has an upper portion thereof projecting upward from the lower frame 3B. The pivot shaft 15 has a supporting base 16 fixed to the upper end thereof for supporting the bottom wall of mixing container 2.

The supporting base 16 is formed of band plates arranged in a cross and defining upward bends 16A at the four outer ends to extend along outer side surfaces of the mixing container 2. The upward bends 16A serve to maintain the mixing container 2 in place without displacement.

When the mixing container 2 is placed on the supporting base 16, the axis of mixing container 2 (first axis X) is in alignment with the pivot shaft 15.

The supporting base 16 has, attached to the ends of at least one opposed pair of the four bends 16A, locking devices 18 for locking the lid 10 to a closed position relative to the main container body 9.

As shown in FIG. 2, each locking device 18 includes a clamp link 18A pivotally connected at one end thereof to the end of one bend 16A, and a locking strip 18B pivotally connected at a lower end thereof to the other end of clamp link 18A. The locking strip 18B has an engaging hook 18C formed at the upper end thereof.

On the other hand, the lid 10 defines an engaging recess 10A extending circumferentially thereof. With the clamp link 18A swung upward, the hook 18C may be connected to the engaging recess 10A. Thereafter the clamp link 18A is turned downward beyond a vertical to pull the locking strip 18B downward, thereby pressing the lid 10 to the locked position against the main container body 9.

The supporting base 16 is not limited to the cruciform configuration in plan view, but may be circular or rectangular where appropriate.

As shown in FIG. 3, the lid 10 has an opening 10B formed centrally thereof to be coaxial with the first axis X. The lid 10 has a cylindrical coupling 20 projecting upward from the circumferential edge of opening 10B.

The upper frame 3A also has an opening 3D formed in a lower forward surface thereof to be coaxial with the first axis X, and a cylindrical coupling 21 projecting downward from the circumferential edge of opening 3D. The coupling 21 is removably fitted around the coupling 20 to be rotatable relative thereto about the first axis X.

Thus, the mixing container 2 is rotatably supported by the first support frame 3, at the bottom wall thereof through the pivot shaft 15 and supporting base 16, and adjacent the opening 8A through the coupling 21 fitted with the coupling 20 of lid 10.

As shown in two-dot chain lines in FIG. 3, the upper frame 3A may be swung upward about the connecting rods 12 to disengage the coupling 21 from the coupling 20. In this state, the locking devices 18 may be released to render the lid 10 removable from the main container body 9.

By releasing the locking devices 18, the main container body 9 may easily be detached from the supporting base 16 (i.e. from the pivot shaft 15) to facilitate maintenance such as cleaning of the mixing container 2.

The lid 10 may be adapted inseparable from the upper frame 3A. In this case, the lid 10 may be detached from the main container body 9 by an upward pivotal movement of the upper frame 3A.

As shown in FIGS. 2 and 3, the second support frame 5 is approximately L-shaped in side view, and includes a base 5A placed on a floor or the like, and a support stand 5B extending upward from the rear end of base 5A. The second support frame 5 has a slightly larger width in front view than the mixing container 2. The base 5A has guards 5C formed at right and left sides and approximately triangular in front view. These guards 5C extend through the fore and aft length of the base 5A to cover lateral areas of the lower frame 4B.

Figure 5:
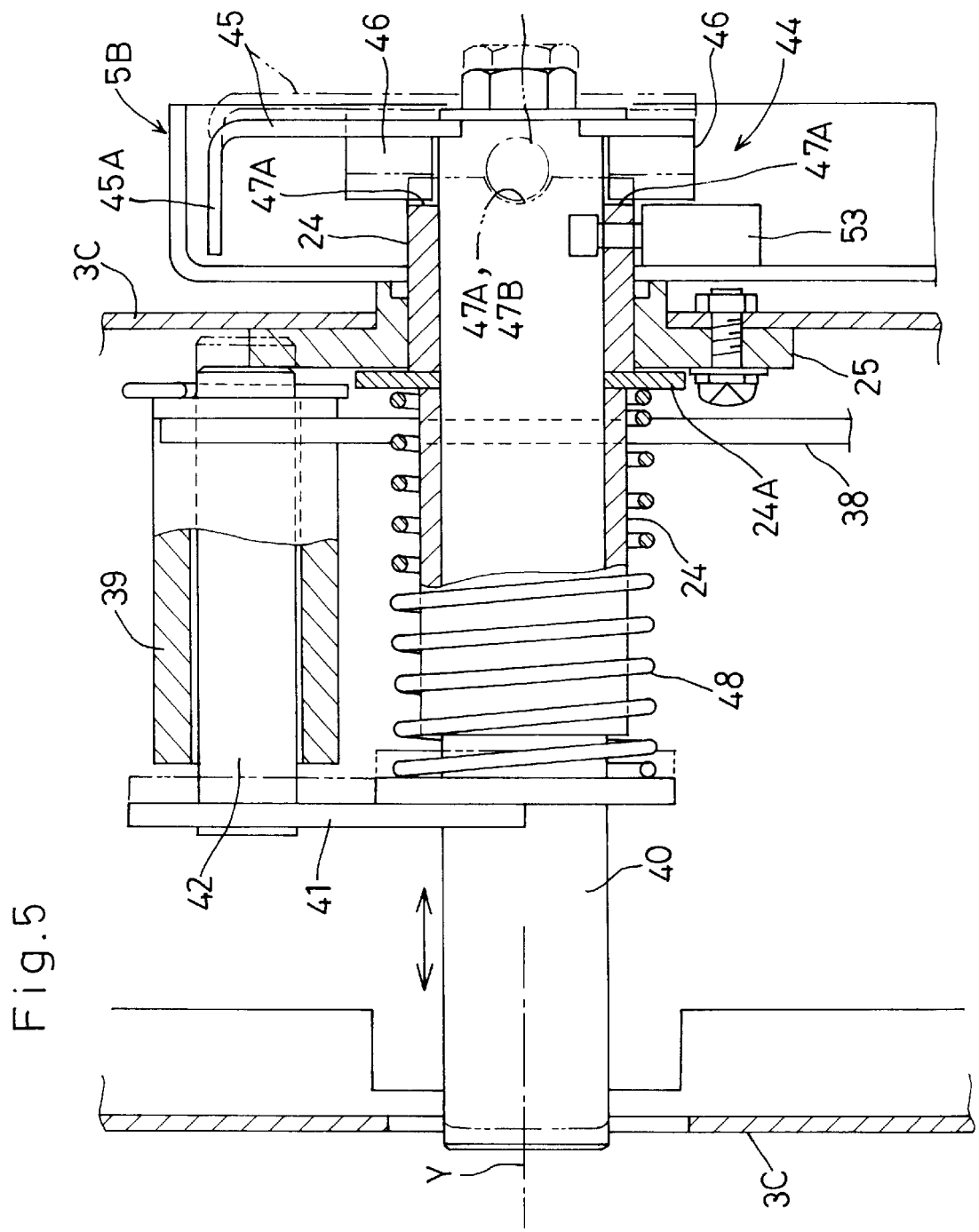
FIG. 5 is a sectional side view showing details of a connection between the first and second support frames.

As shown in FIG. 5 also, the support stand 5B has a tubular support shaft 24 projecting forward from an upper position thereof. The middle frame 3C of the first support frame 3 has a fore and aft bore formed in a vertically middle position in a rear surface thereof, with a bearing 25 fixed to this bore. The support shaft 24 is fitted in the bearing 25 to be rotatable relative thereto.

Thus, the first support frame 3 is cantilevered by the second support frame 5 to be rotatable (posture-variable) relative thereto about the second, fore and aft axis Y perpendicular to the first axis X.

It is also possible to form the first support frame 3 in a square in side view to enclose the entire circumference of the mixing container 2. The second support frame 5 may be constructed for rotatably supporting the first support frame 3 in both front and rear positions thereof.

With the food mixing apparatus 1 in this embodiment, when loading or unloading food into/out of the mixing container 2, the container 2 is placed in a vertical posture with the opening 9A of main container body 9 turned upward (the position shown in FIGS. 2, 3 and 7; hereinafter called the first posture A). When mixing or otherwise processing food, a control lever 50 disposed on the upper frame 3A of first support frame 3 is manually operated, as the first stage, with the first and second driving devices 4 and 6 stopped, to turn the first support frame 3 and mixing container 2 in the direction of an arrow D in FIG. 7 about the second axis Y by an angle (1 (see FIG. 8). As a result, the mixing container 2 is placed in an inclined posture with the opening 9A turned obliquely upward (the position shown in FIG. 8; hereinafter called the second posture B).

Figure 9:
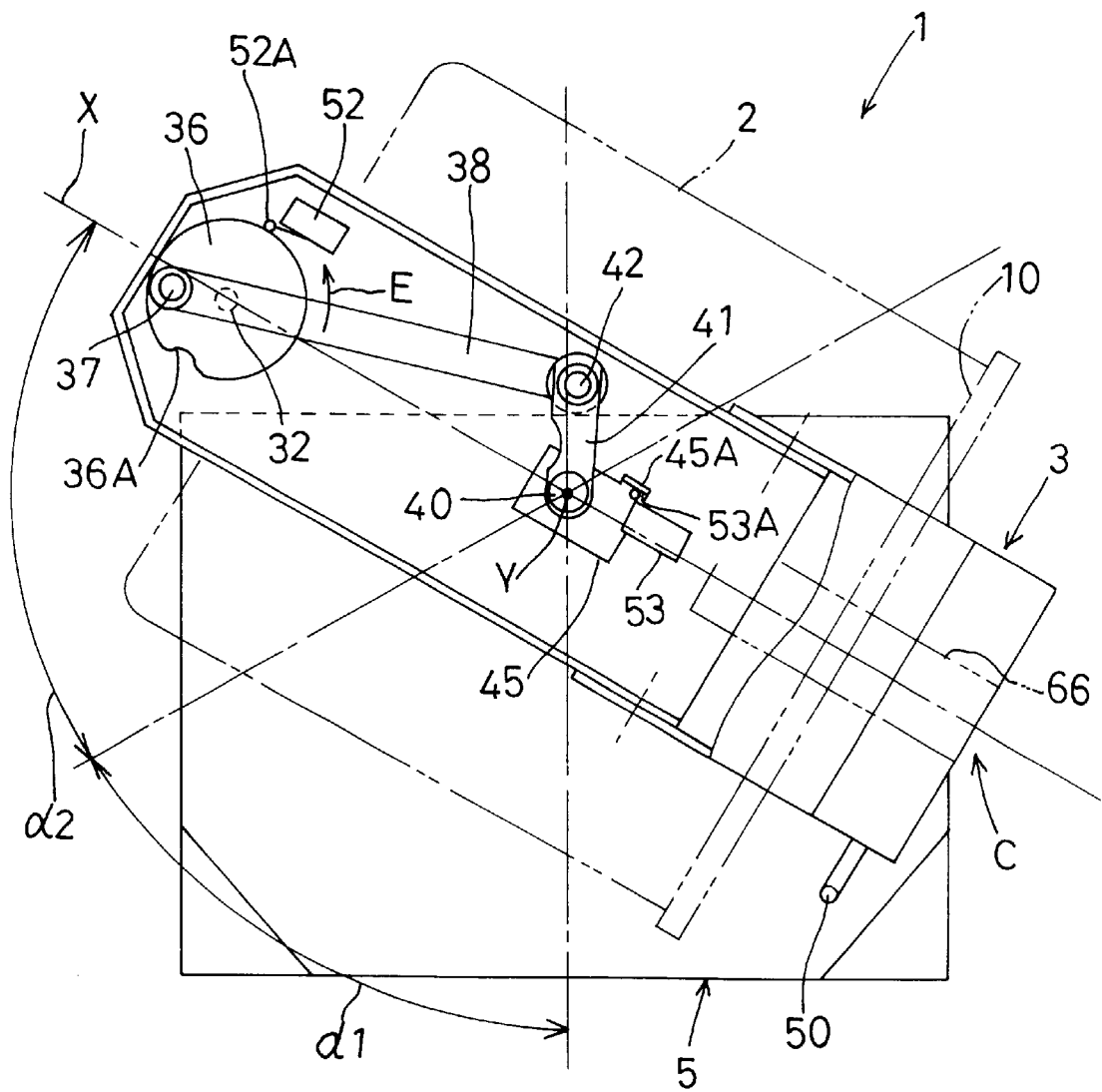
FIG. 9 is a sectional front view showing the first support frame in the third posture.
Figure 10:
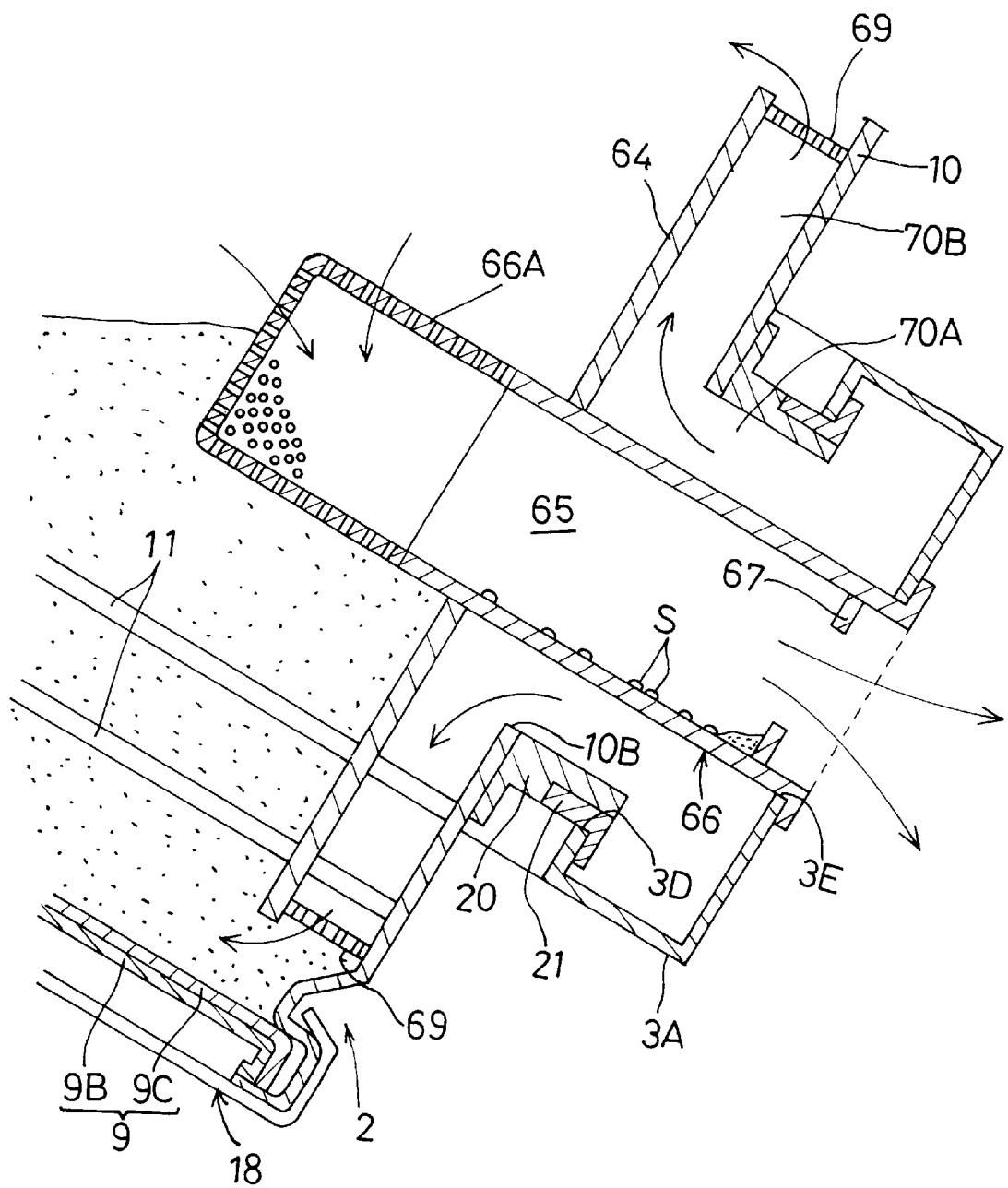
FIG. 10 is an enlarged sectional view of a region including an aerating mechanism.

Thereafter, the food inside the mixing container 2 is mixed by operating the first driving device 4 to rotate the mixing container 2 about the first axis X, while the second driving device 6 reciprocates the mixing container 2 between the second posture B and a posture further turned clockwise by a predetermined angle (2 (the position shown in FIGS. 4, 9 and 10; hereinafter called the third posture C).

In this embodiment, each of the angles (1 and (2 is set to about 60 (. Thus, the first support frame 3 and mixing container 2 are oscillated up and down within a range of about 30 (across a horizontal posture.

The first and second driving devices 4 and 6 will be described in detail later.

As shown in FIGS. 2 and 3, the aerating mechanism 7 includes a blower unit (ventilating unit) 62 having a motor 60 disposed in an upper position in the middle frame 3C, and a fan 61 disposed in a rearward position in the upper frame 3A and driven by the motor 60.

The upper frame 3A has an air intake 63 formed in an upper surface thereof above the blower unit 62. The blower unit 62 is operable to draw ambient air (cooling air) through the air intake 63.

The upper surface of upper frame 3A defines an opening 3E on the common axis X with the opening 10B formed in the lid 10 (acting as a wall according to this invention). The opening 3E has an air discharge tube (ventilating tube) 66 projecting downward therefrom.

The discharge tube 66 extends downward through the upper frame 3A, couplings 20, 21 and opening 10B, and has a lower end thereof disposed in the main container body 9. The bottom surface and lower side surface of discharge tube 66 are formed of a porous member 66A such as wire netting or perforated metal. This construction permits air to flow into and out of the mixing container 2 and prevents the food leaking through the discharge tube 66 out of the container 2.

A guide member 64 is disposed inwardly of the lid 10 and spaced therefrom to allow a circulation of air. The guide member 64 is in the form of a disc extending radially outwardly from an outer periphery in a vertically intermediate position of discharge tube 66. The guide member 64 has an outside diameter slightly smaller than an inside diameter of the main container body 9, and covers the opening 10B of lid 10 from inside.

The guide member 64 is not connected or fixed directly to the discharge tube 66, but fixed to the discharge tube 66 through the stirring members 11, a leak preventing member 69 described later, or other brackets. The discharge tube 66 is movable out of the guide member 64 when the upper frame 3A swung upward about the connecting rods 12.

However, where the lid 10 is inseparably attached to the upper frame 3A, the guide member 64 may be connected and fixed directly to the discharge tube 66.

As shown in FIGS. 3 and 4, cooling air entering the upper frame 3A from the air intake 63 flows into the mixing container 2 through a first passage 70A formed between the inner walls of couplings 20, 21 and opening 10B of lid 10, and the discharge tube 66. Further, the cooling air is guided to flow radially outwardly toward the side walls of mixing container 2 through a second passage 70B formed between the lid 10 and guide member 64.

The cooling air guided to the side walls of mixing container 2 is deflected by the side walls toward the bottom wall, thereby to circulate in the mixing container 2. Subsequently, the cooling air is discharged through a third passage 65 formed in the discharge tube 66.

That is, the guide member 64 forms the second passage 70B with the lid 10 to control (or deflect) the cooling air flows radially outwardly and prevent the cooling air from exiting directly through the discharge tube 66 without circulating in the container 2. As a result, the food is cooled evenly in a short time.

Since the cooling air flows into and out of the mixing container 2 by way of the same portion of lid 10, the main cylinder body 9 need not define additional openings or the like. This feature provides advantages of low manufacturing cost and a simplified construction of main container body 9.

Between the outer periphery of guide member 64 and the inner surface of lid 10 is a ring-shaped leak preventing member 69 formed of a porous material such as wire netting or perforated metal.

The leak preventing member 69 allows air flows between the second passage 70B and mixing container 2. When the mixing container 2 is placed in the third posture C shown in FIGS. 4, 9 and 10, the leak preventing member 69 stops the food entering the second passage 70B, thereby preventing its leakage from the mixing container 2.

The leak preventing member 69 may be formed by bending the outer end of guide member 64 toward the lid 10 and forming vents in the bent portion, or by extending the guide member 64 into contact with the side walls of the main container body 9 and forming vents in the extended portion.

As shown in FIG. 4, a barrier 67 is disposed in the discharge tube 66. The barrier 67 is ring-shaped to extend circumferentially on the inner surface of discharge tube 66 and define a center opening for allowing passage of air. The barrier 67 is disposed in a portion of discharge tube 66 projecting from the mixing container 2 (and inside the first support frame 3) and as close to the opening at the projecting end as possible.

The air having entered the mixing container 2 and cooled the food by circulating therein is discharged at a high temperature and as containing steam from the discharge tube 66. The inner peripheral surface of discharge tube 66, particularly that of the portion of discharge tube 66 projecting from the mixing container 2, is cooled by ambient air. Thus, the air containing steam and passing through the discharge tube 66 forms dew drops S on the inner peripheral surface (see FIG. 10).

On the other hand, the mixing container 2 is oscillated up and down by the second driving device 6. When the mixing container 2 assumes the third posture C, tilting the discharge tube 66 downward as shown in FIGS. 4, 9 and 10, the dew drops S on the inner peripheral surface of discharge tube 66 tend to flow downward.

However, the dew drops S hardly flow out since the barrier 67 stops the dew drops S. In this way, the apparatus 1 and its surroundings are not wetted, to avoid litter and dust adhering to wet parts, thereby to maintain a sanitary environment.

Figure 8:
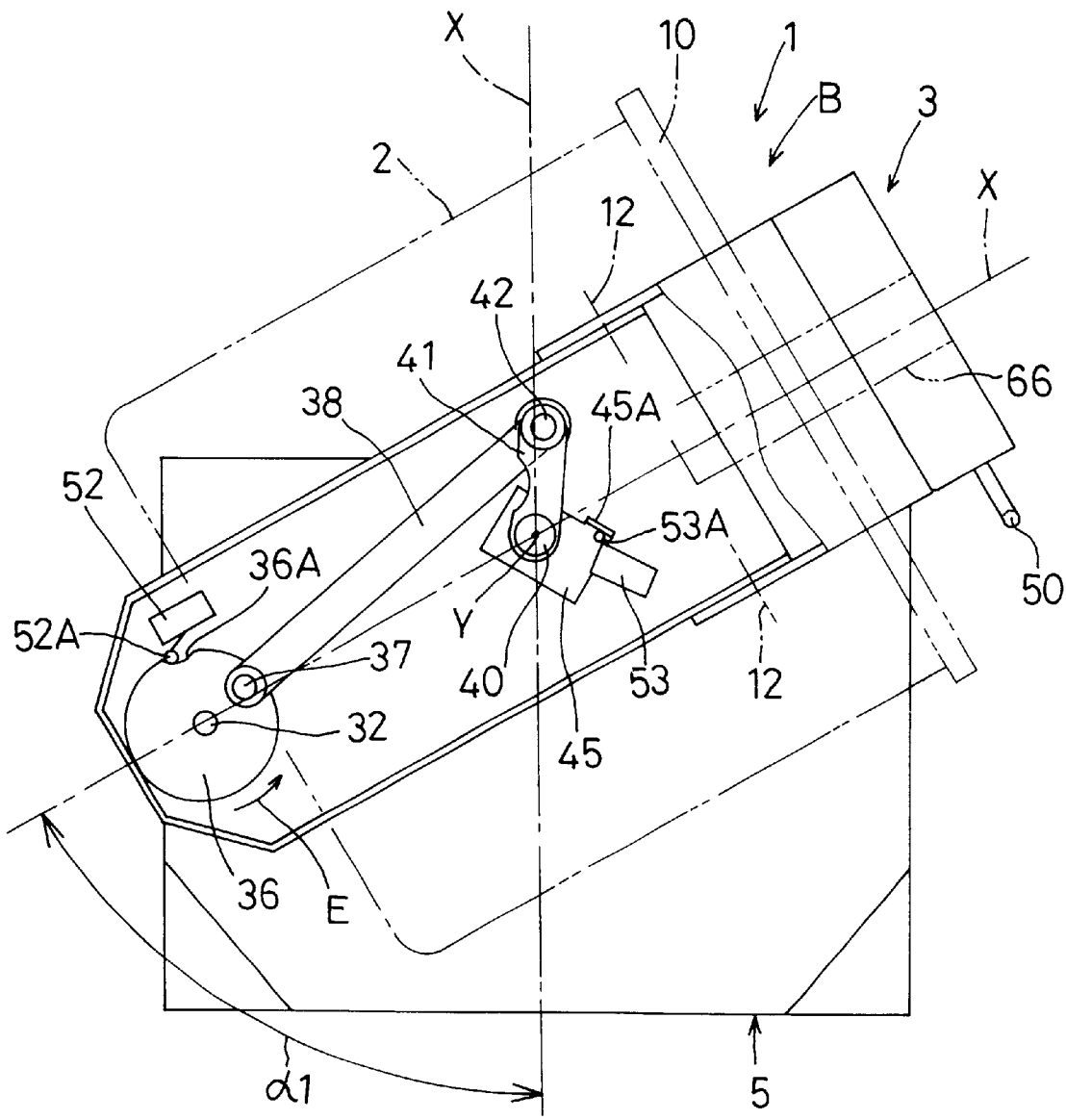
FIG. 8 is a sectional front view showing the first support frame in a second posture.

The dew drops S stopped by the barrier 67 return into the mixing container 2 when the container 2 swings upward to direct the discharge tube 66 upward (FIG. 8). This avoids dew drops accumulating in the discharge tube 66 and overflowing the barrier 67.

In addition, since the mixing container 2 oscillates up and down, there is little possibility of the dew drops S being scattered to the ambient by centrifugal force.

The first and second driving devices 4 and 6 will be described in detail hereinafter.

As shown in FIGS. 2 and 3, the first driving device 4 includes a drive motor 30 disposed in a lower portion of the middle frame 3C of first support frame 3, a transmission shaft 32 extending in the fore and aft direction and rotatably supported in the lower frame 3B through a bearing bracket 31, a transmission mechanism 33 having bevel gears for connecting the transmission shaft 32 to an output shaft of drive motor 30, the pivot shaft 15 noted hereinbefore for supporting the bottom of mixing container 2, and a transmission mechanism 34 having bevel gears for connecting the pivot shaft 15 to a forward end of transmission shaft 32.

The drive motor 30 is operable to rotate the pivot shaft 15 through the transmission shaft 32 and transmission mechanisms 33 and 34. The mixing container 2 is thereby rotated about the first axis X through the supporting base 16 fixed to the pivot shaft 15.

The second driving device 6 shares the drive motor 30, transmission shaft 32 and transmission mechanism 33 with the first driving device 4. The second driving device 6 further includes an interlocking mechanism 35 connected to the rear end of transmission shaft 32.

As shown in FIGS. 3 and 5, the interlocking mechanism 35 includes a disc crank 36 connected to the rear end of transmission shaft 32, a link 38 having one end thereof pivotally connected to a peripheral position of crank 36 through a connecting shaft 37, a retainer tube 39 fixed to the other end of link 38 and extending in the fore and aft direction, a pivot shaft 40 mounted in the tubular support shaft 24 attached to the second support frame 5 to be rotatable and axially slidable relative thereto, an arm 41 having one end thereof fixed to the pivot shaft 40, and a connecting pin 42 attached to the other end of arm 41 and axially slidably mounted in the retainer tube 39.

Figure 7:
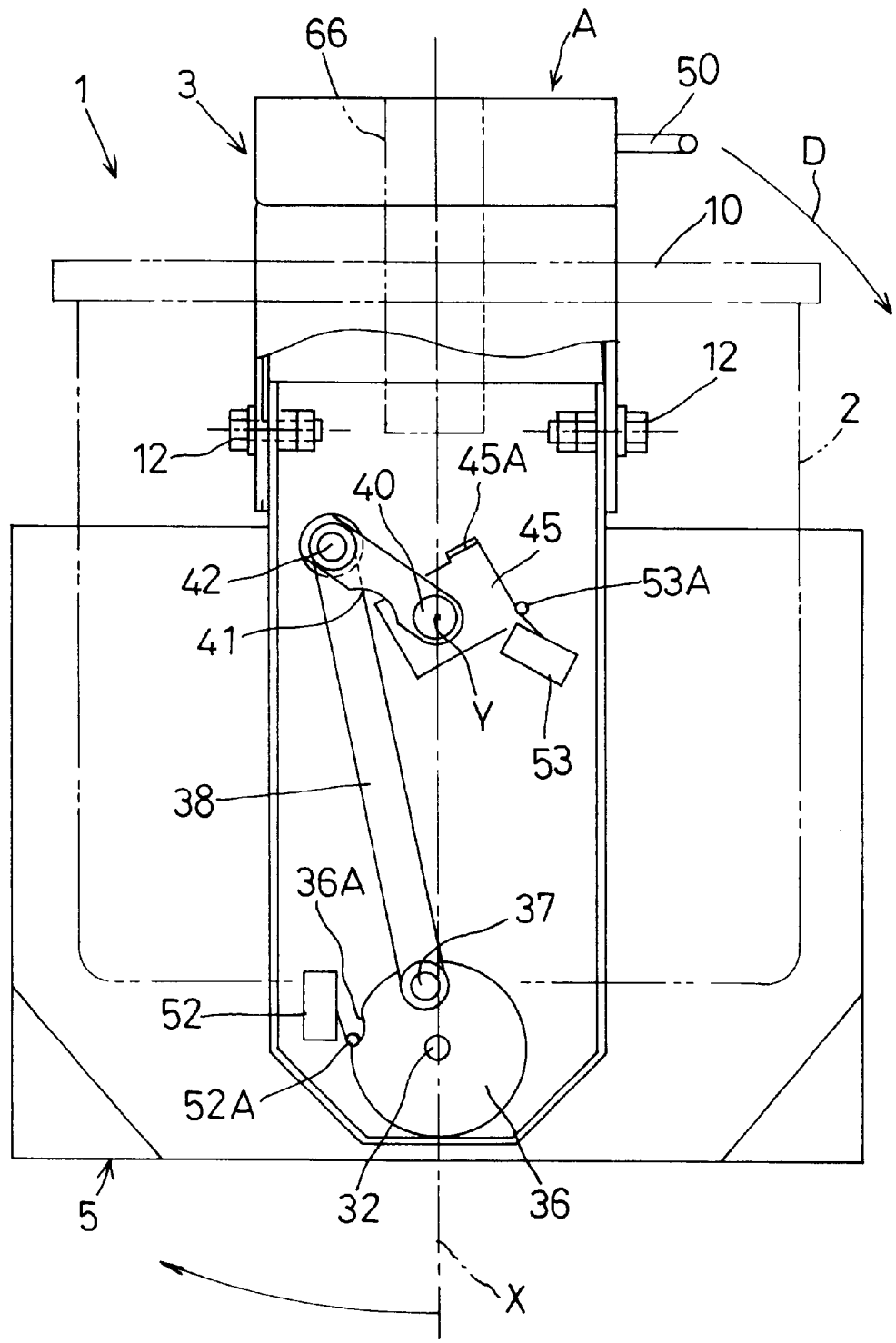
FIG. 7 is a sectional front view showing the first support frame in a first posture.

As shown in FIGS. 7 and 8, when the first support frame 3 is swung between the first and second postures A and B, the pivot shaft 40 rotates about the axis Y so that the link 38 and arm 41 maintain a fixed angle therebetween. The crank 36 has rotational positions set such that, when the first support frame 3 is in the first and second postures A and B, the connecting shaft 37 lies between the transmission shaft 32 and connecting pin 42 and on a segment extending therebetween.

The first support frame 3 pulled up by the link 38 from the second posture B to the third posture C when the pivot shaft 40 is locked against rotation by a lock mechanism 44 to be described hereinafter, and the drive motor 30 is operated to rotate the crank 36 approximately 180 (in the direction of arrow E (or in the opposite direction) about the axis of transmission shaft 32. By further rotating the crank 36 180 (, the first support frame 3 is returned to the second posture B.

Thus, the first support frame 3 and mixing container 2 are oscillate back and forth with rotation of the crank 36, within the range of predetermined angle (2 about the second axis Y The pivot shaft 40 and support shaft 24 have the lock mechanism 44 for locking the pivot shaft 40 against rotation to oscillate the mixing container 2 and first support frame 3 between the first and second postures A and B.

Figure 6:
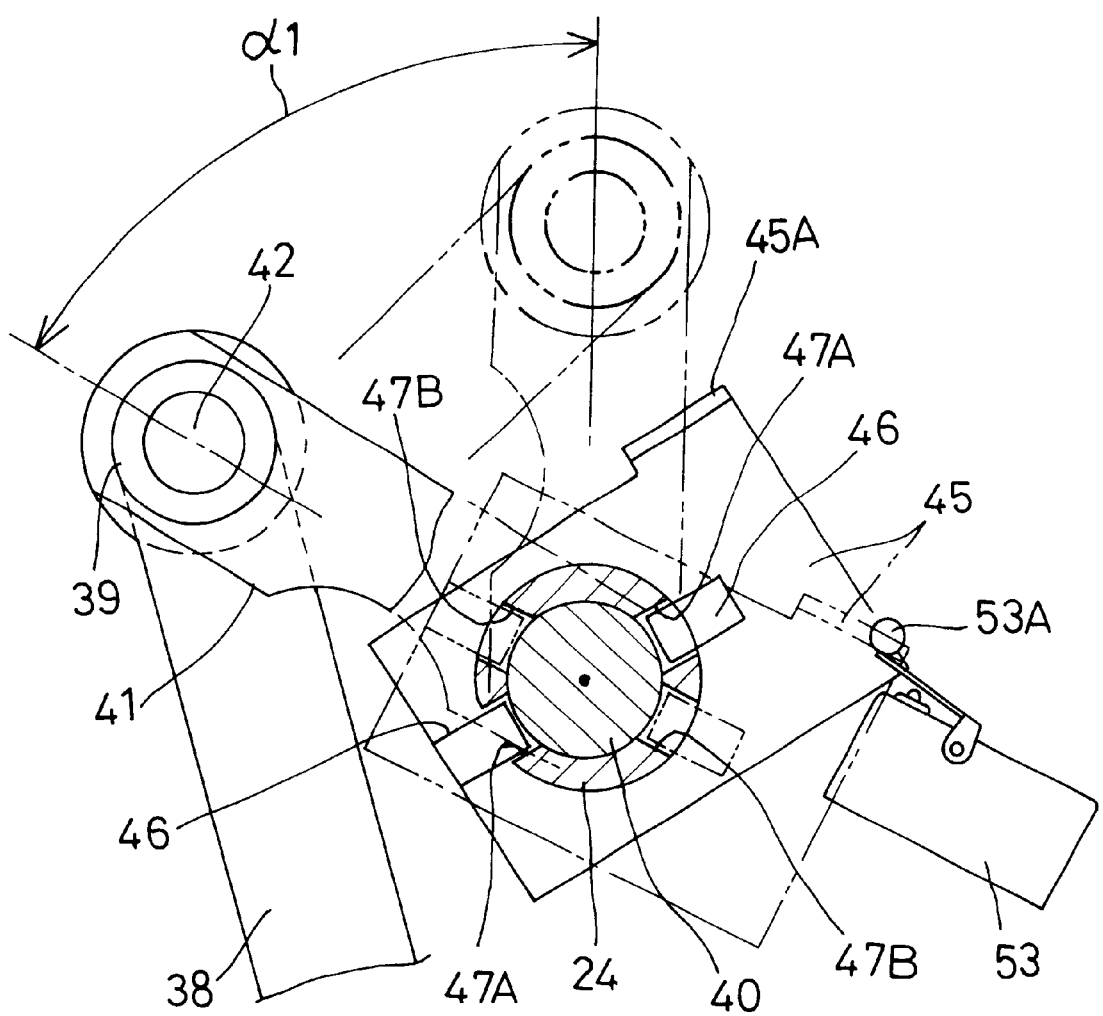
FIG. 6 is a front view of a lock mechanism.

As shown in FIGS. 5 and 6, the lock mechanism 44 includes a pair of lock elements 46 formed on a plate 45 fixed to the rear end of pivot shaft 40, two pairs of lock grooves 47A and 47B formed in the rear end surface of support shaft 24 to be releasably engageable by the pair of lock elements 46, and a biasing member 48 in the form of a compression coil spring mounted on the support shaft 24 between a flange 24A projecting radially of support shaft 24 and the proximal end of arm 41 to bias the lock elements 46 in a direction (forward) to engage the lock grooves 47A and 47B.

The lock grooves 47A and 47B form a pair 47A engageable by the lock elements 46 when the first support frame 3 is placed in the first posture A, and a pair 47B engageable by the lock elements 46 when the first support frame 3 is placed in the second posture B. These pairs are out of phase with each other by the predetermined angle (1 (approximately 60 (in this embodiment) about the pivot shaft 40. As shown in dot-and-chain lines in FIG. 5, the lock elements 46 are formed cylindrical, while the lock grooves 47A and 47B have an arcuate section for receiving outer peripheral surfaces of lock elements 46.

Thus, when the first support frame 3 is placed in the first posture A, the lock elements 46 engage one pair of lock groove 47A. As a result, the pivot shaft 40 is locked against rotation, and the first support frame 3 is retained in the first posture A.

When the control lever 50 is pulled in the direction of arrow D against the engaging force of lock elements 46 (i.e. the force of biasing member 48) to engage the lock grooves 47A, the first support frame 3 pivots about the axis Y. This movement is transmitted through the transmission shaft 32, crank 36, connecting shaft 37, link 38 and arm 41, and causes rotation of pivot shaft 40. As a result, the lock elements 46 become disengaged from the pair of lock grooves 47A, and the pivot shaft 40 slides backward against the biasing member 48.

When the first support frame 3 assumes the second posture B, the lock elements 46 register with the other pair of lock grooves 47B and are engaged with these grooves 47B by the force of biasing member 48, thereby locking the pivot shaft 40 again. Thus, the first support frame 3 becomes oscillate with the pivot shaft 40 locked.

A first sensor 52 in the form of a limit switch is disposed in a lower position in the first support frame 3 for detecting the first support frame 3 in the first posture A or second posture B. The sensor 52 has a control piece 52A in contact with the outer peripheries of crank 36. When the first support frame 3 is in the first posture A or second posture B, the control piece 52 is operable by a recessed cam groove 36A formed peripherally of crank 36.

A second sensor 53 in the form of a limit switch is disposed adjacent the support shaft 24 in the second support frame 5 for detecting the first support frame 3 in the second posture B or oscillating between the second posture B and third posture C. The second sensor 53 has a control piece 53A operable through contact with a bent portion 45A of plate 45 fixed to the rear end of pivot shaft 40.

When only the first sensor only 52 is actuated, it is determined that the first support frame 3 is in the first posture A. When both the first and second sensors 52 and 53 are actuated, the first support frame 3 is determined to be in the second posture B. When only the second sensor 53 is actuated, the first support frame 3 is determined to be oscillating between the second posture B and third posture C, excluding the second posture B.

In the above construction, when the drive motor 30 of first and second driving devices 4 and 6 is operated, with the first support frame 3 and mixing container 2 placed in the second posture B, the mixing container 2 rotates about the first axis X, and the first support frame 3 and mixing container 2 oscillate, in an approximately sideways posture, up and down between the second posture B and third posture C.

With the mixing container 2 making a complex movement combining the rotation about the first axis X and the oscillation about the second axis Y, the food inside moves along the inner side surface of mixing container 2, counter to the direction of its rotation. The food moving in this way is cut, loosened, and mixed in the fore and aft direction by the stirring members 11 extending substantially horizontally. The food moves also between the bottom wall and lid 10 of the mixing container 2 to be mixed right and left. That is, the food mixing apparatus 1 in this embodiment moves the food fore and aft and right and left to mix the food evenly in a short time.

The mixing container 2 making such a complex movement can mix the food well even when the food is placed in a large quantity for the capacity of mixing container 2. In other words, a large quantity of food may be mixed even where the mixing container 2 is small, which contributes to compactness of the apparatus. Thus, this invention is particularly useful for a relatively small food mixing apparatus which may be used in an ordinary home, small restaurant or the like.

The mixing container 2 and first support frame 3 are oscillate only by the predetermined angle (about 60 ( ) instead of rotating 360 (about the second axis Y This minimizes vibration, and reduces a load occurring, for example, at the connection between the first and second support frames 3 and 5.

A simplified construction and cost reduction are achieved since the first and second driving devices 4 and 6 share the same drive motor 30. The two driving devices 4 and 6 may be operated in synchronism with each other reliably through the same transmission shaft 32.

The transmission shaft 32 of first and second driving devices 4 and 6 may have clutches 55 and 56 mounted thereon for connecting and disconnecting power transmission. Then, the two driving devices 4 and 6 may be operated individually or intermittently.

The first and second driving devices 4 and 6 (especially the drive motor 30) are arranged substantially opposite the aerating mechanism 7 (especially the blower device 62) across the second axis Y This arrangement assures an excellent weight balance of the first support frame 3 to suppress vibration resulting from the oscillation of the first support frame 3.

This invention is not limited to the foregoing embodiment but may be modified as appropriate.

For example, food may be mixed by oscillating the mixing container 2 and first support frame 3 in the first posture A, sideways through a predetermined angle. The second driving device 6 may be disposed in the second support frame 5.

The angle of oscillation of the first support frame 3 and mixing container 2, for mixing food, is not limited to the angle noted above but may be varied as appropriate. It is also possible to mix food by continuously rotating the first support frame 3 and mixing container 2 360 (about the second axis Y It is not essential that the first axis X and second axis Y extend perpendicular to each other, but may be in a slanted relationship. The first axis X may extend transversely and perpendicular to the axis of mixing container 2, and the second axis Y perpendicular (or slanted) to the first axis X.

The first support frame 3 may be formed to have a square section in side view to enclose the entire mixing container 2. The second support frame 5 may be constructed for rotatably supporting the first support frame 3 in front and rear positions thereof.

The food mixing apparatus according to this invention may be used not only to mix boiled rice and vinegar, but also to mix and cool boiled rice with assorted materials, spaghetti, potato or macaroni salads and so on.

This invention is not limited to a relatively small food mixing apparatus, but is applicable also to a large food mixing apparatus for use in a large restaurant, sushi shop and so on. The apparatus may have another apparatus built in or disposed next thereto for automatically supplying vinegar or other seasonings.

What is claim is:

1. A food mixing apparatus comprising:
   a mixing container for receiving food;
   a first support frame for supporting said mixing container to be rotatable about a first axis, said first support frame including an aerating device for feeding cooling air into said mixing container, an air intake for allowing said aerating device to draw ambient air as the cooling air, and an air outlet for discharging the cooling air from said mixing container;
   a first drive mechanism disposed in said first support frame for rotating said mixing container about a first axis;
   a second support frame for supporting said first support frame to be rotatable about a second axis; and
   a second drive mechanism for rotating said first support frame about said second axis;
   wherein during mixing of food received in said mixing container, said first and second drive mechanisms are simultaneously actuated to rotate said mixing container about said first axis while rotating said mixing container about said second axis.

2. A food mixing apparatus as defined in claim 1, wherein said first and second drive mechanisms are driven by a single drive source.

3. A food mixing apparatus as defined in claim 1, wherein said first support frame is reciprocally oscillated about said second axis.

4. A food mixing apparatus as defined in claim 3, wherein said first axis and said second axis extend perpendicular to each other.

5. A food mixing apparatus as defined in claim 1, wherein said second drive mechanism is disposed in said first support frame.

6. A food mixing apparatus as defined in claim 5, wherein said first and second drive mechanisms are driven by a single drive source.

7. A food mixing apparatus as defined in claim 5, wherein said first support frame includes an aerating device for feeding cooling air into said mixing container, said aerating device and a drive source of said first and second drive mechanisms being opposed to each other across said second axis.

8. A food mixing apparatus as defined in claim 1, wherein said mixing container has an opening formed in a wall thereof, an ventilating tube extending through said opening, and a guide member disposed in said mixing container and extending radially outwardly of said ventilating tube to cover said opening as spaced therefrom;
   said opening and said ventilating tube defining a first passage therebetween for circulating air, said wall and said guide member defining a second passage therebetween in communication with said first passage; and
   said ventilating tube defining a third passage therein in communication with said second passage through said mixing container.

9. A food mixing apparatus as defined in claim 8, wherein said wall and said guide member have a leakage preventing member disposed therebetween for allowing a circulation of air and preventing the food from leaking from said mixing container.

10. A food mixing apparatus as defined in claim 9, wherein said mixing container includes a main container body in form of a bottomed cylinder, and a lid for openably closing an opening formed in said main container body, said lid acting as said wall defining said opening.

11. A food mixing apparatus as defined in claim 1, further comprising:
- a discharge tube disposed in said mixing container for discharging air having cooled the food; and
- a barrier mounted in said discharge tube for stopping water flowing out of said discharge tube when said discharge tube is directed downward.

12. A food mixing apparatus as defined in claim 11, wherein said discharge tube extends from inside to outside of said mixing container, said barrier being formed in an inner periphery of a portion of said discharge tube projecting from said mixing container.

13. A food mixing apparatus comprising:
- a mixing container having;
  - a container body for receiving food; and
  - a lid detachably connected to said container body;
- a first support frame for supporting said mixing container to be rotatable about a first axis, said first support frame having;
  - a lower frame region for supporting said container body; and
  - an upper frame region for securing said lid, said upper frame region being upwardly pivotable relative to said lower frame region, wherein pivoting said upper frame region upwardly from said lower frame region detaches said lid of said mixing container from said container body;
- a first drive mechanism disposed in said first support frame for rotating said mixing container;
- a second support frame for supporting said first support frame to be variable in posture relative to said second support frame; and
- a second drive mechanism for displacing said first support frame from one posture to another.

14. The food mixing apparatus as defined in claim 13, wherein
- said first support frame is supported by said second frame to be rotatable about a second axis, and
- wherein, during mixing of food received in said mixing container, said first and second drive mechanisms are simultaneously actuated to rotate said mixing container about said first axis while rotating said mixing container about said second axis.

15. The food mixing apparatus as defined in claim 14, wherein said upper frame region of said first support frame is pivotable relative to said lower frame region about a third axis.

16. The food mixing device as defined in claim 14, wherein said first and second drive mechanisms are driven by a single drive source.

* * * * *

UNITED STATES PATENT AND TRADEMARK OFFICE
CERTIFICATE OF CORRECTION

PATENT NO.      : 6,595,680 B2
DATED           : July 22, 2003
INVENTOR(S)     : Keiichi Sanpei et al.

It is certified that error appears in the above-identified patent and that said Letters Patent is hereby corrected as shown below:

Column 2,
Line 13, "360(." should read -- 360°. --.

Column 6,
Line 62, "angle (1" should read -- angle α1 --. (both occurrences).
for both occurences Column 7,
Line 4, "angle (2" should read -- angle α2 --.
Line 6, "angles (1 and (2" should read -- angles α1 and α2 --.
Line 7, "60 (." should read -- 60° .--.
Line 9, "30 ( " should read -- 30° --.
Line 48, "swung" should read -- is swung --.

Column 9,
Line 44, "180 (" should read -- 180° --.
Lines 46- 47, "180 (" shuld read -- 180° --.
Line 52 "(2" should read -- α2 --.
Line 52, "Y" should read -- Y. --.

Column 10,
Line 6, "(1" should read -- α1 --.
Lines 6-7, "60 (" should read -- 60° --.
Line 49, "only 52" should read -- 52 --.

Column 11,
Line 19, "oscillate" should read -- oscillatable --.
Line 19, "60 ( )" should read -- 60 ° --.
Line 20, "360(" should read -- 360 ° . --.
Lines 20 and 38, "Y" should read -- Y.--.
Line 53, "360 (" should read -- 360° . --.
Line 54, "Y" should read -- Y.--.

Column 12,
Line 55, "an ventilating" should read -- a ventilating --.

UNITED STATES PATENT AND TRADEMARK OFFICE
CERTIFICATE OF CORRECTION

PATENT NO.    : 6,595,680 B2
DATED         : July 22, 2003
INVENTOR(S)   : Keiichi Sanpei et al.

It is certified that error appears in the above-identified patent and that said Letters Patent is hereby corrected as shown below:

<u>Column 13,</u>
Line 22 and 27, "having;" should read -- having: --.

Signed and Sealed this

First Day of June, 2004

JON W. DUDAS
*Acting Director of the United States Patent and Trademark Office*